(12) United States Patent
Westerdahl et al.

(10) Patent No.: US 7,982,465 B2
(45) Date of Patent: Jul. 19, 2011

(54) ELECTROMAGNETIC METHOD ON SHALLOW WATER USING A CONTROLLED SOURCE

(75) Inventors: Harald Westerdahl, Dal (NO); Svein Erling Johnstad, Bønes (NO); Brian Anthony Farrelly, Rådal (NO)

(73) Assignee: Multifield Geophysics AS, Laksevag (NO)

( * ) Notice: Subject to any disclaimer, the term of this patent is extended or adjusted under 35 U.S.C. 154(b) by 484 days.

(21) Appl. No.: 12/223,914

(22) PCT Filed: Feb. 12, 2007

(86) PCT No.: PCT/NO2007/000044
§ 371 (c)(1),
(2), (4) Date: Sep. 29, 2008

(87) PCT Pub. No.: WO2007/094676
PCT Pub. Date: Aug. 23, 2007

(65) Prior Publication Data
US 2009/0278541 A1   Nov. 12, 2009

(30) Foreign Application Priority Data
Feb. 13, 2006  (NO) .................................. 20060685

(51) Int. Cl.
*G01V 3/12* (2006.01)
*G01V 3/08* (2006.01)

(52) U.S. Cl. ......... 324/365; 324/323; 324/337; 324/357
(58) Field of Classification Search .................... 324/365
See application file for complete search history.

(56) References Cited

U.S. PATENT DOCUMENTS

| 7,812,611 | B2 * | 10/2010 | Johnstad et al. | 324/365 |
| 2004/0027130 | A1 * | 2/2004 | Ellingsrud et al. | 324/334 |
| 2006/0103387 | A1 | 5/2006 | Amundsen | |
| 2009/0243617 | A1 * | 10/2009 | Farrelly et al. | 324/337 |

FOREIGN PATENT DOCUMENTS

| GB | 2 385 923 | 9/2003 |
| GB | 2 411 006 | 1/2006 |
| WO | 2005/096021 | 10/2005 |

OTHER PUBLICATIONS

International Search Report issued May 21, 2007 in the International (PCT) Application of which the present application is the U.S. National Stage.
Patent Cooperation Treaty (PCT) International Preliminary Report on Patentability, issued May 8, 2008.

* cited by examiner

*Primary Examiner* — Ha Tran T Nguyen
*Assistant Examiner* — Emily Y Chan
(74) *Attorney, Agent, or Firm* — Wenderoth, Lind & Ponack, L.L.P.

(57) ABSTRACT

A method for analyzing acquired electromagnetic measurements (R) made at or in a sea (4) over a seafloor (1) with rock formations (3) having relatively low resistivity ($\rho_3$) for detecting a possibly underlying petroleum bearing reservoir formation (2) having relatively high resistivity ($\rho_2$), wherein a low frequency electromagnetic transmitter (5) arranged in the sea (4) emits an electromagnetic field (P) propagating in the sea (4), in the rocks (3, 2) and in the air (0) above the sea; wherein electromagnetic sensors (6) are arranged with desired offsets (x) in the sea (4) for measuring the electromagnetic field (P(x)) while the field propagates, characterized in that one or more component of the electromagnetic field (P) is measured at least one large offset ($x_L$) from the transmitter (5) where the field (P) essentially only has its origin from the field propagating as a field ($P_0$) through the air (0); that the one or more components of the electromagnetic field (P) measured at the large offset ($x_L$) is calculated back to a recalculated field ($F_0(x)$) to one or more offsets (x) being shorter than the large offset ($x_L$); that the recalculated field ($P_0(X)$) is subtracted from the field (P(x)) for possibly highlighting a field which arising due to the possibly petroleum bearing reservoir formation (2) having relatively high resistivity ($\rho_2$).

17 Claims, 16 Drawing Sheets

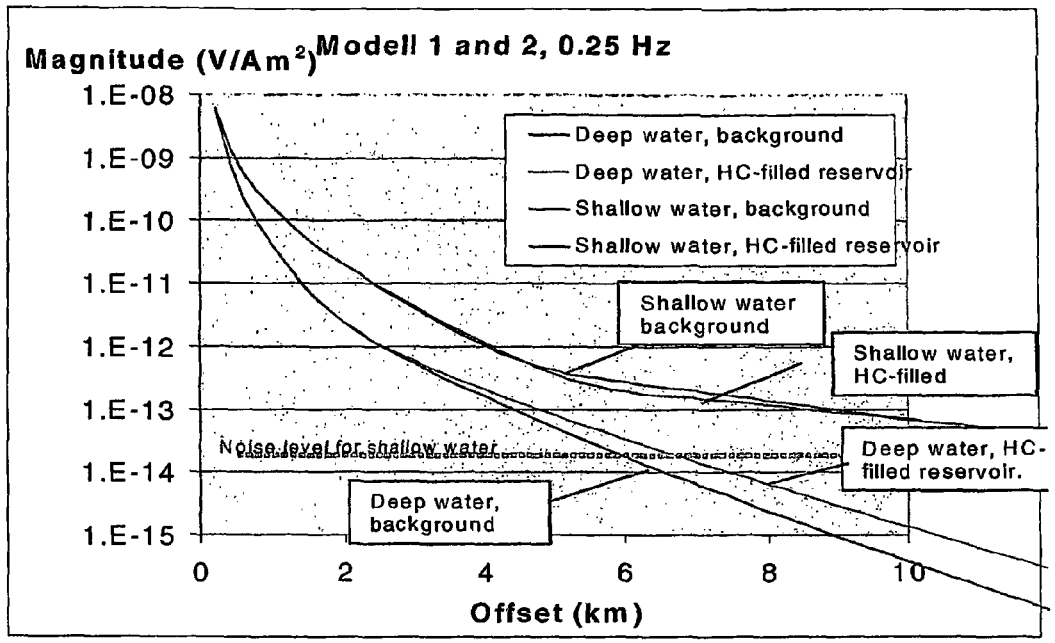
Fig. 1: Model 1 and 2, 0.25 Hz, magnitude-response with and without hydrocarbons in the reservoir. Notice that in shallow water, hydrocarbons will give negative response.
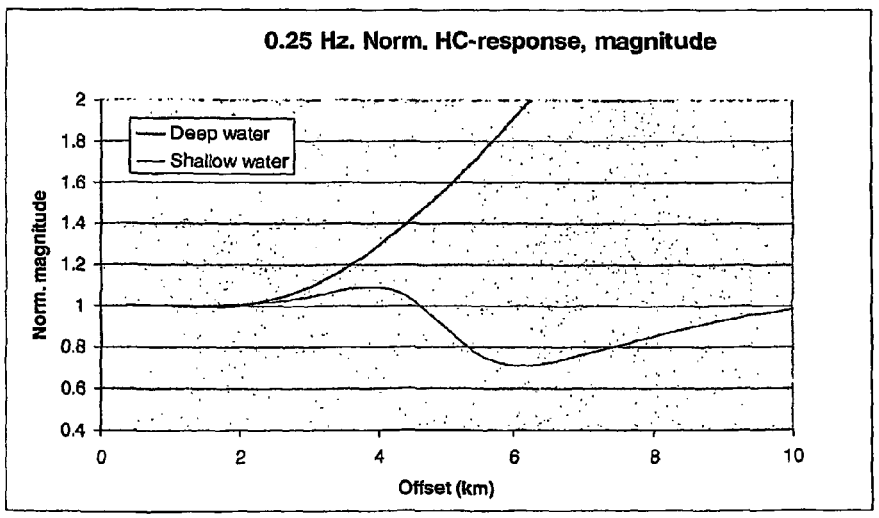
Fig. 2: Normalised magnitude response (response normalised to water-filled reservoir). The "Deep water"-curve has been cut at the expected noise floor for shallow water.

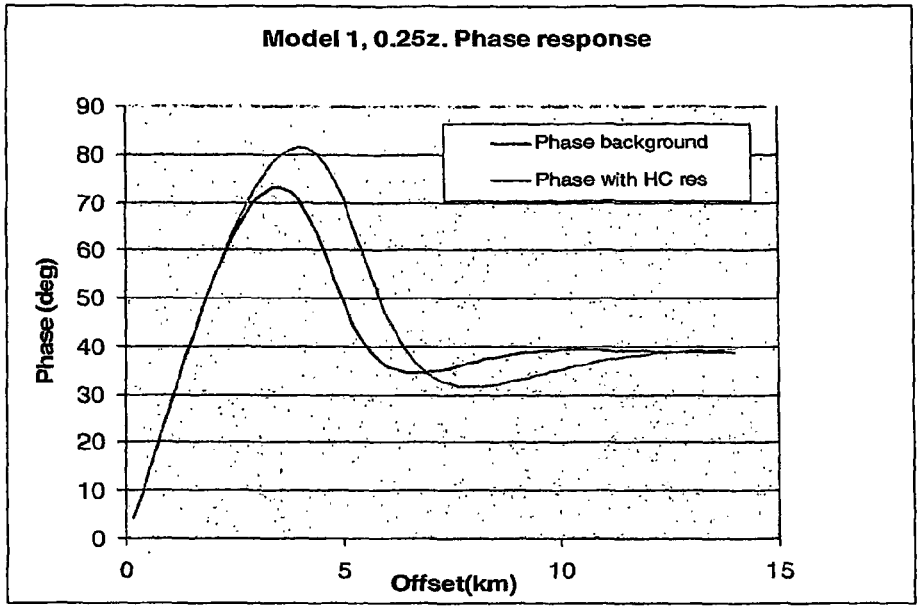
Fig. 3: Model 1, shallow water, 0.25 Hz. phase response
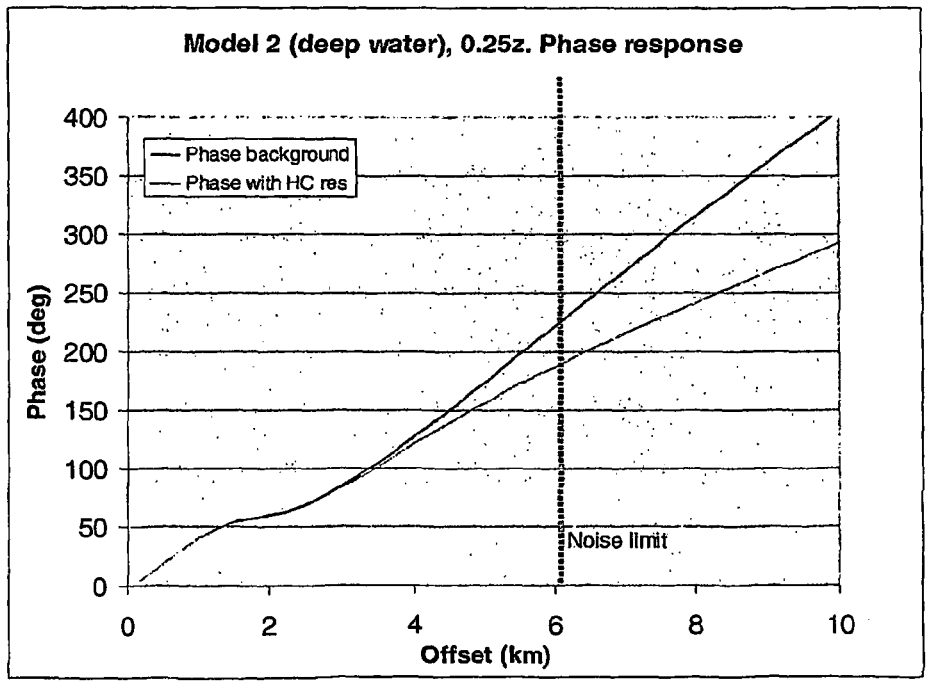
Fig. 4: Model 2, 0.25 Hz, deep water, phase response. 'Noise offset limit' is the expected offset, as counted from the source, for which the signals will be below the noise limit for shallow water

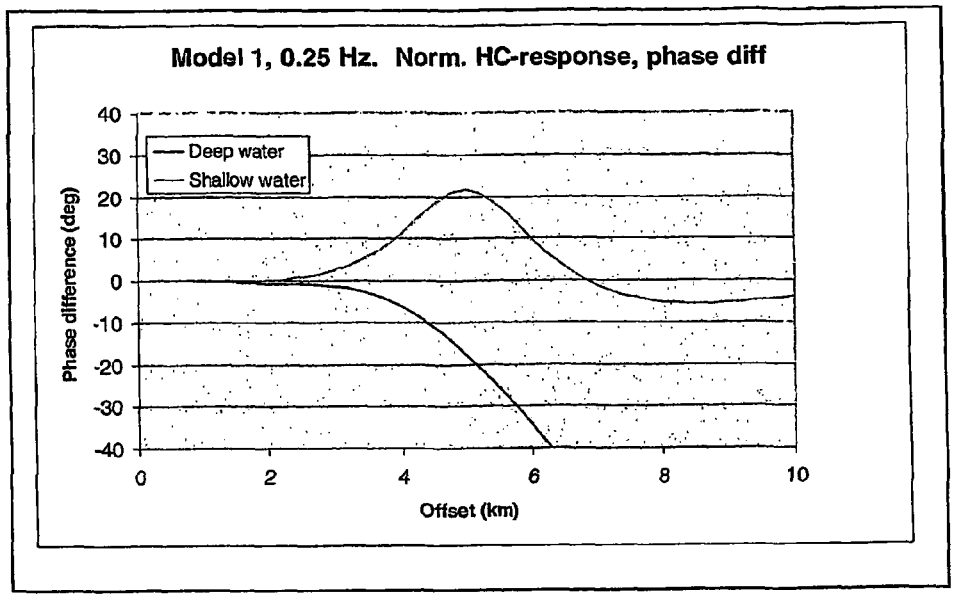
Fig. 5: Normalised phase response (phase difference from the background model)
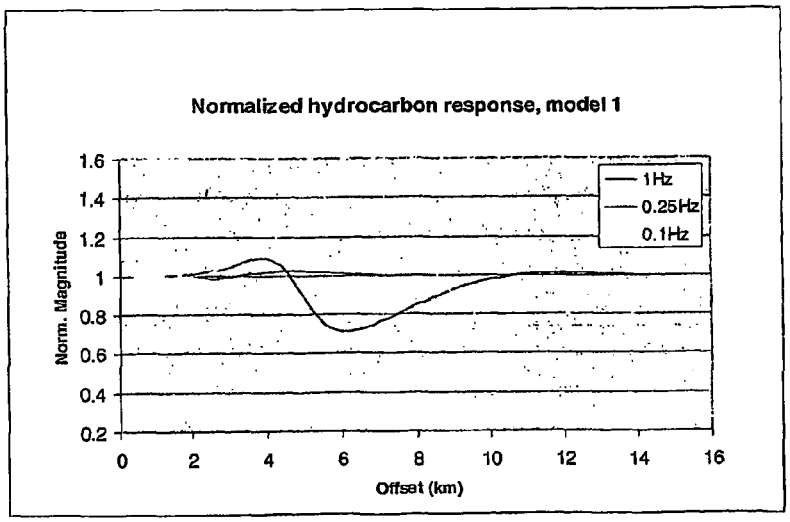
Fig. 6: Normalised magnitude response for model 1 for different frequencies

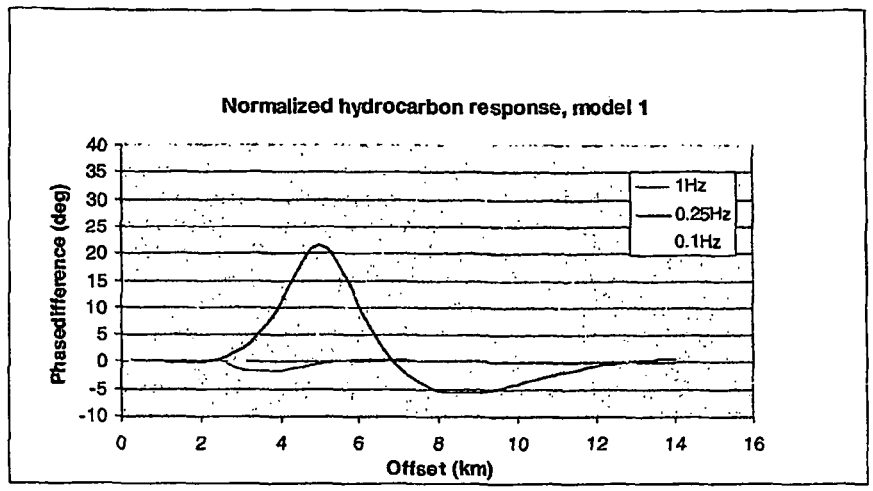
Fig. 7: Normalised phase response for model 1 for different frequencies
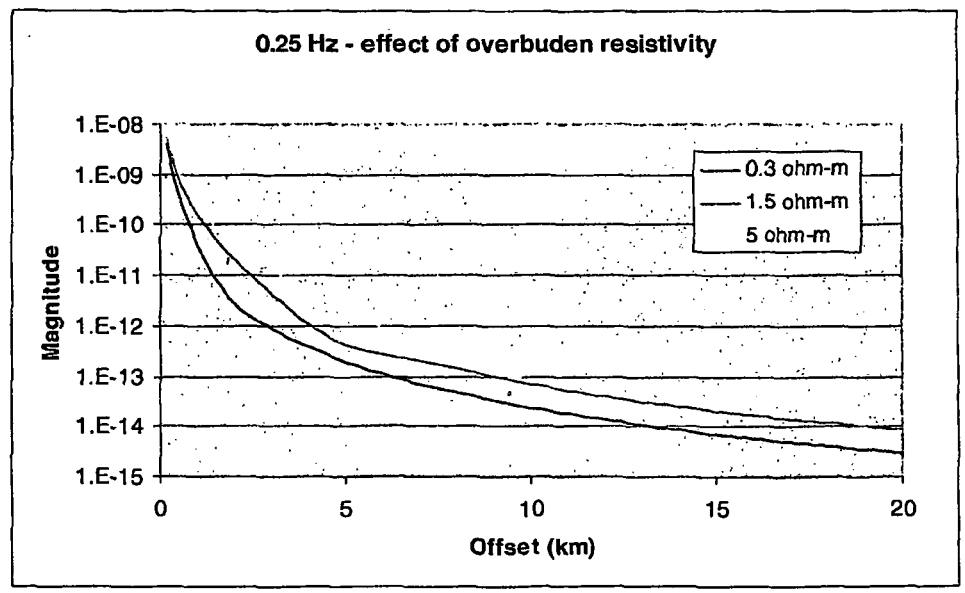
Fig. 8: Magnitude curves for three different overburden models. Otherwise same parameters as for model 1.

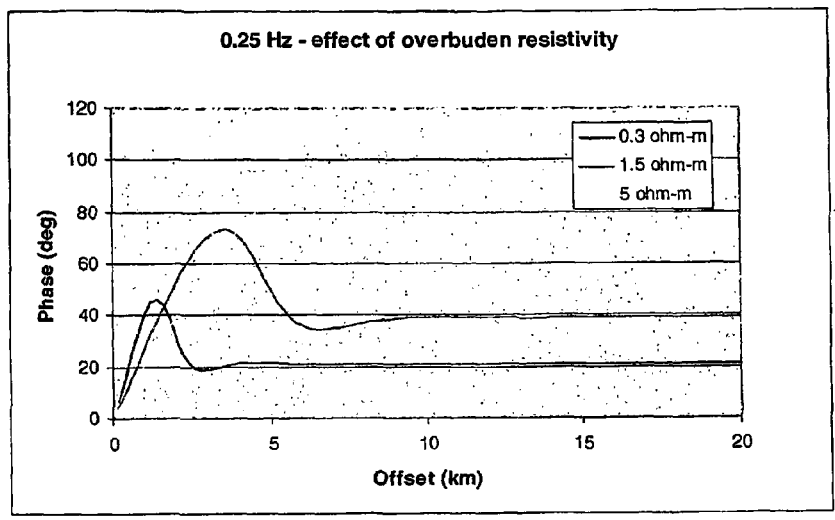
Fig. 9: Phase curves for three different overburden models. Otherwise the same parameters as in model 1.
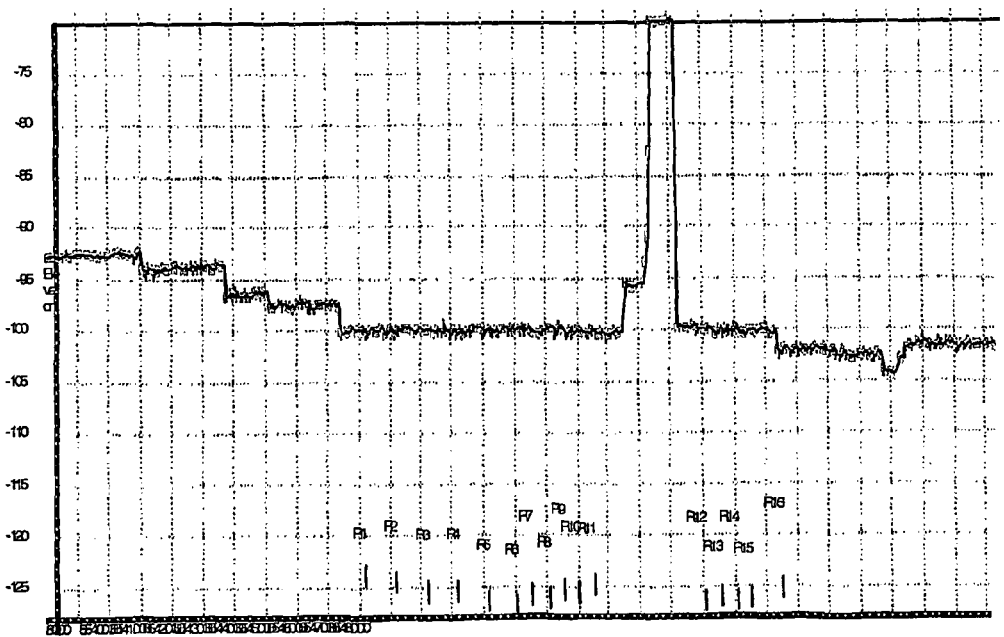
Fig. 10: Variation of the source depth along the HBL-line of the Grane-survey in 2003. The receiver stations are indicated as R1, R2, .. R16.

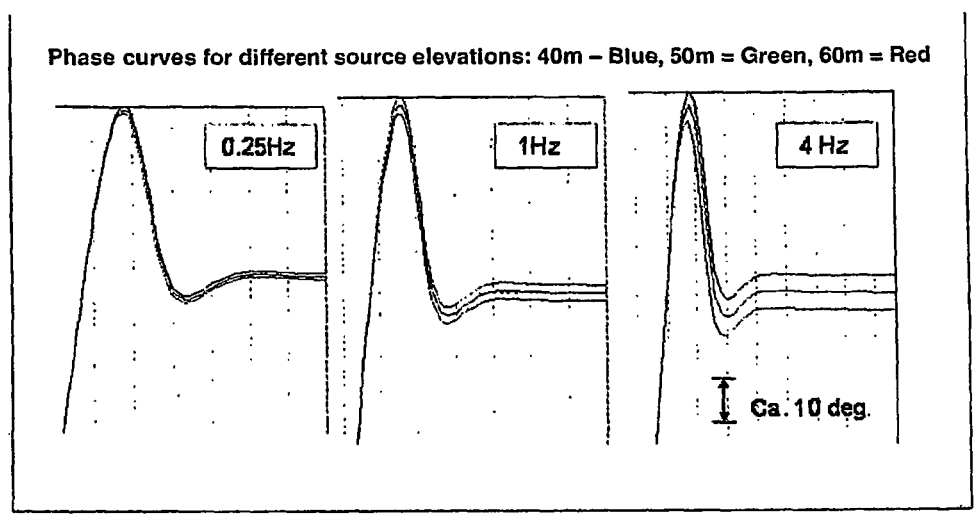
Fig: 11: Change in the phase curve as a function of small variations (10m) of the source elevation above the seafloor. 40 m : blue, 50 m: green, 60 m: red.

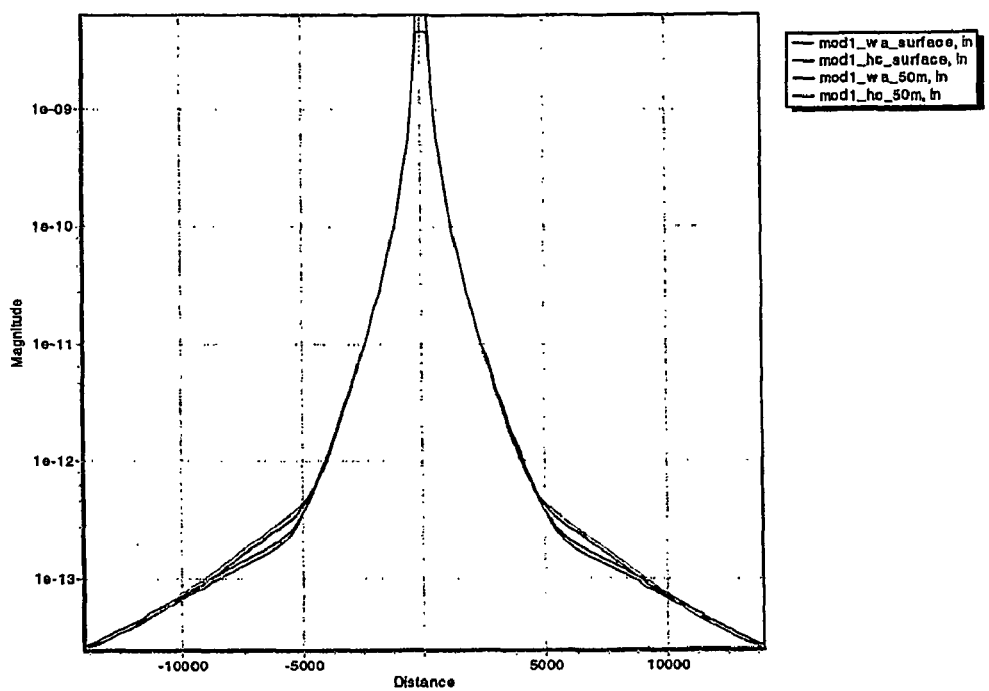
Fig. 12: Results from modelling (model 1) with and without hydrocarbons, of the source arranged 50m above the seafloor and at the surface (125 m above the seafloor).

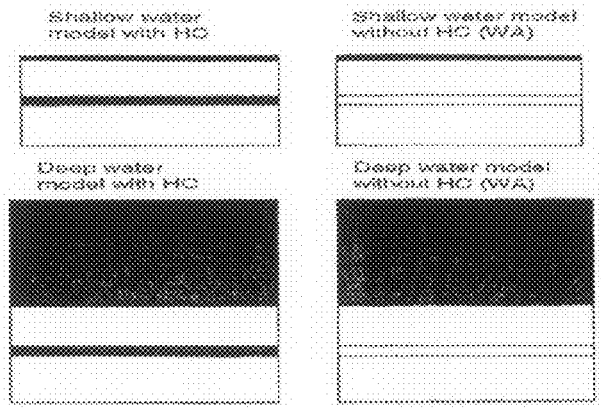
Fig. 13a (above): Models for calculation of synthetic data, and
Fig. 13b (below): The resistivity model of the shallow water model.
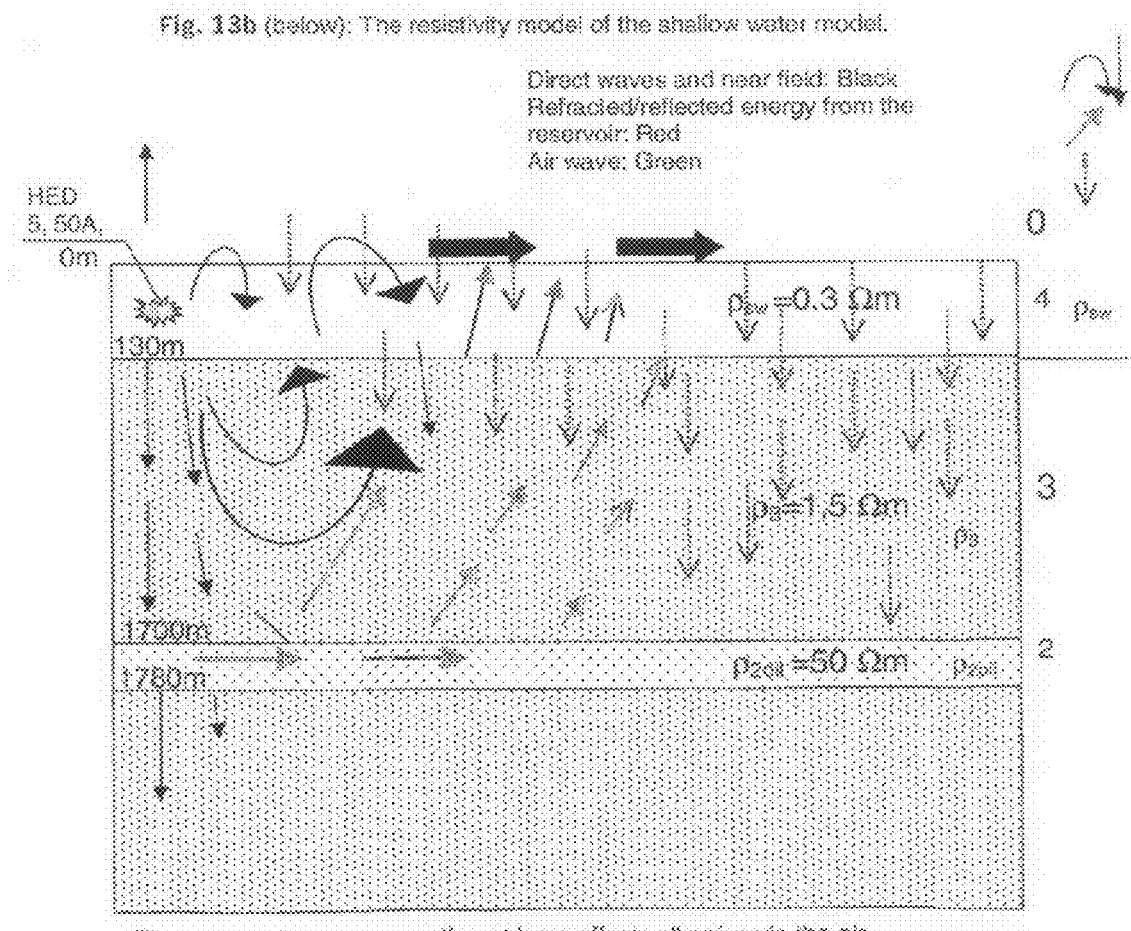

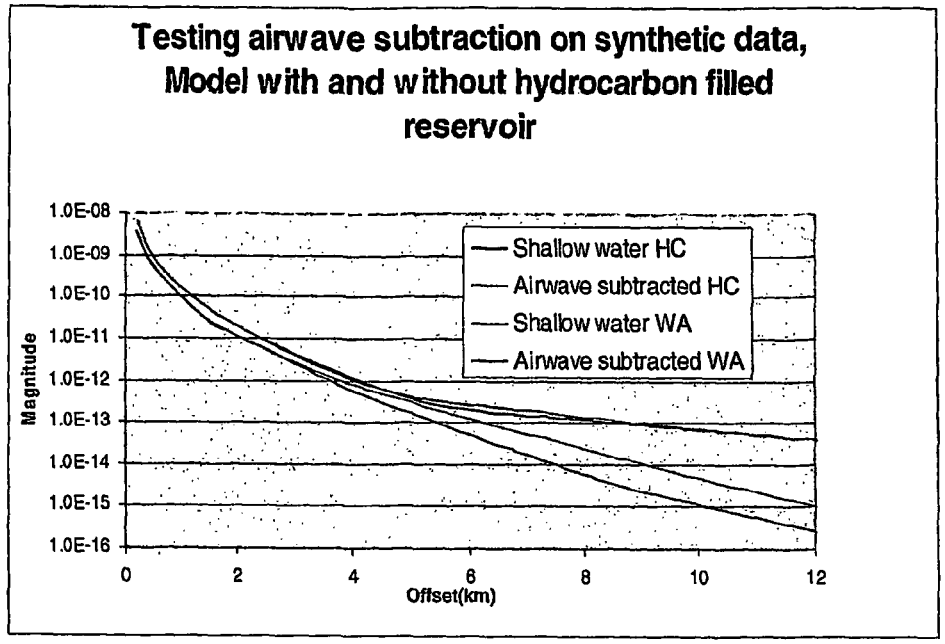
Fig. 14: Results from air wave subtraction on synthetic data from shallow water (model 1): Magnitude
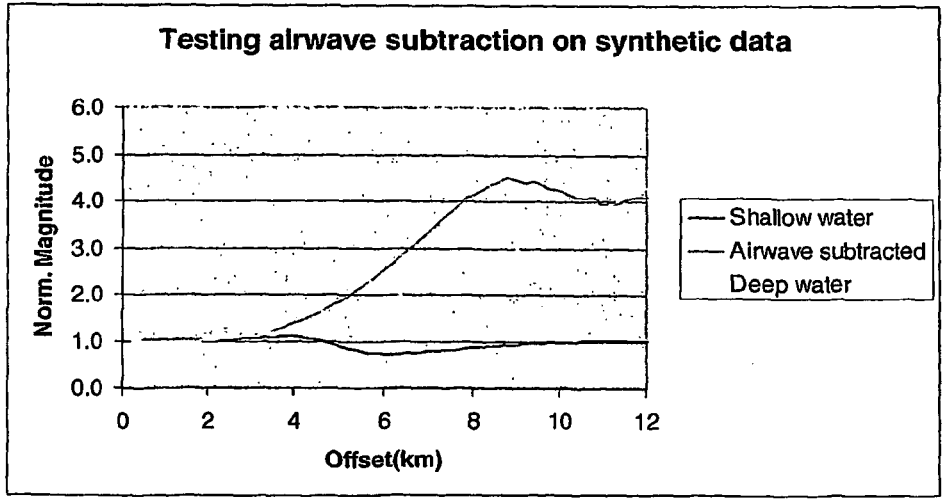
Fig. 15: Results from air wave subtraction on synthetic data from shallow water (model 1): Normalised magnitude, compared to normalised magnitude for the deep water case.

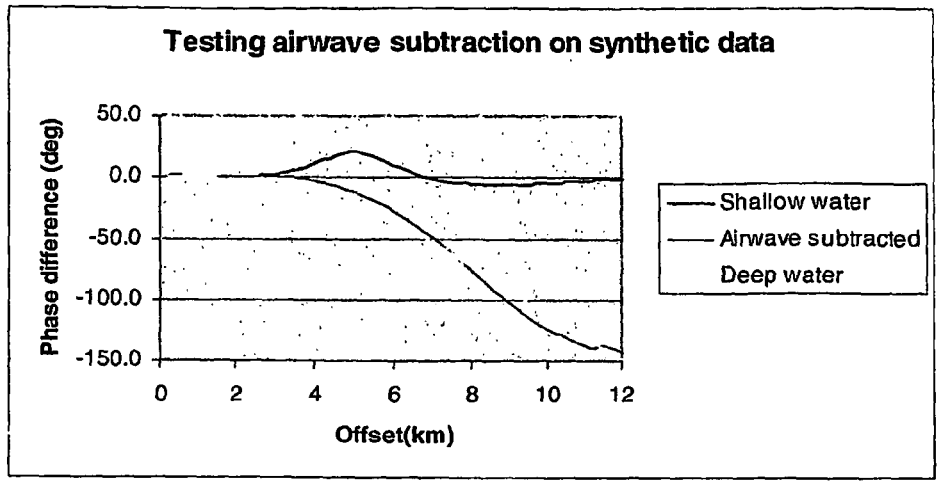
Fig. 16: Results from air wave subtraction on synthetic data from shallow water (model 1): Normalised phase (phase difference), compared with normalised phase for the deep water case.
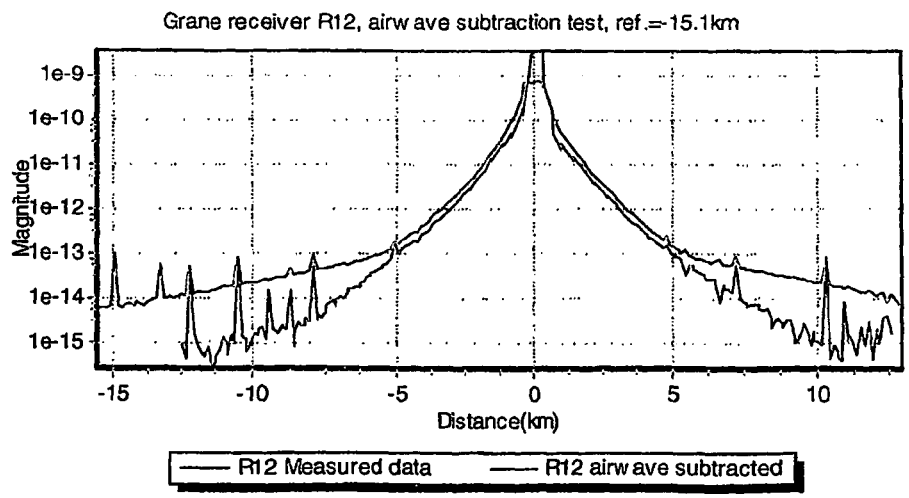
Fig. 17: Results from air wave subtraction on Grane receiver R12- magnitude

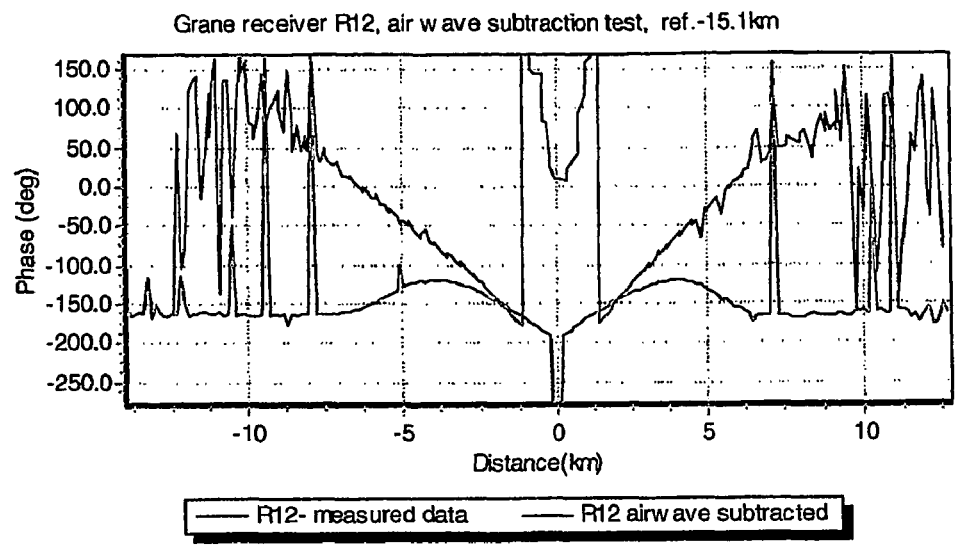
Fig. 18: Results from air wave subtraction on Grane receiver R12- phase
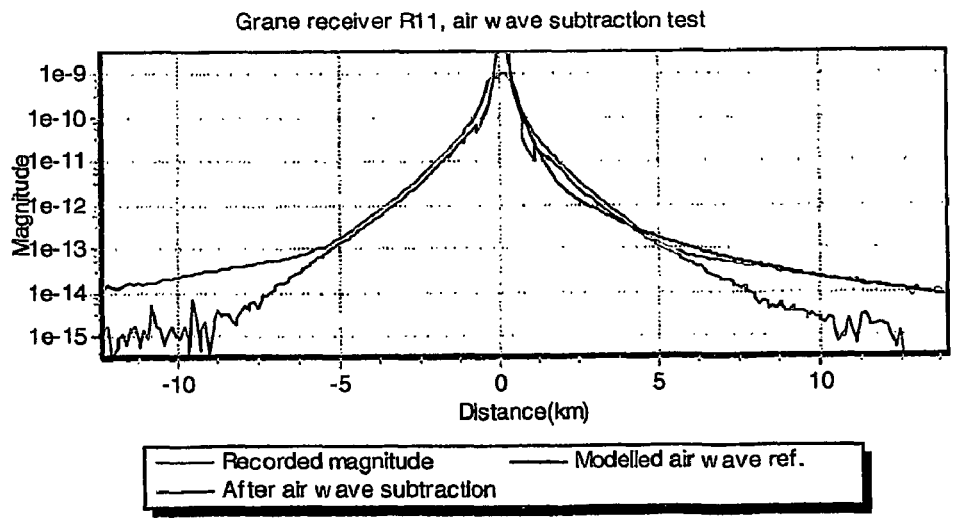
Fig. 19: Results from air wave subtraction on Grane receiver R11- Magnitude

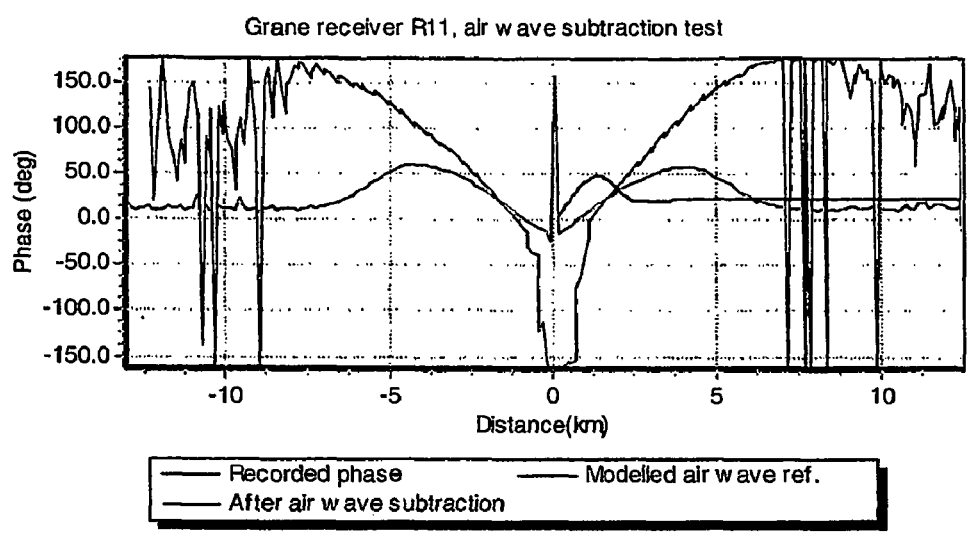
Fig. 20: Results from air wave subtraction on Grane receiver R12- phase

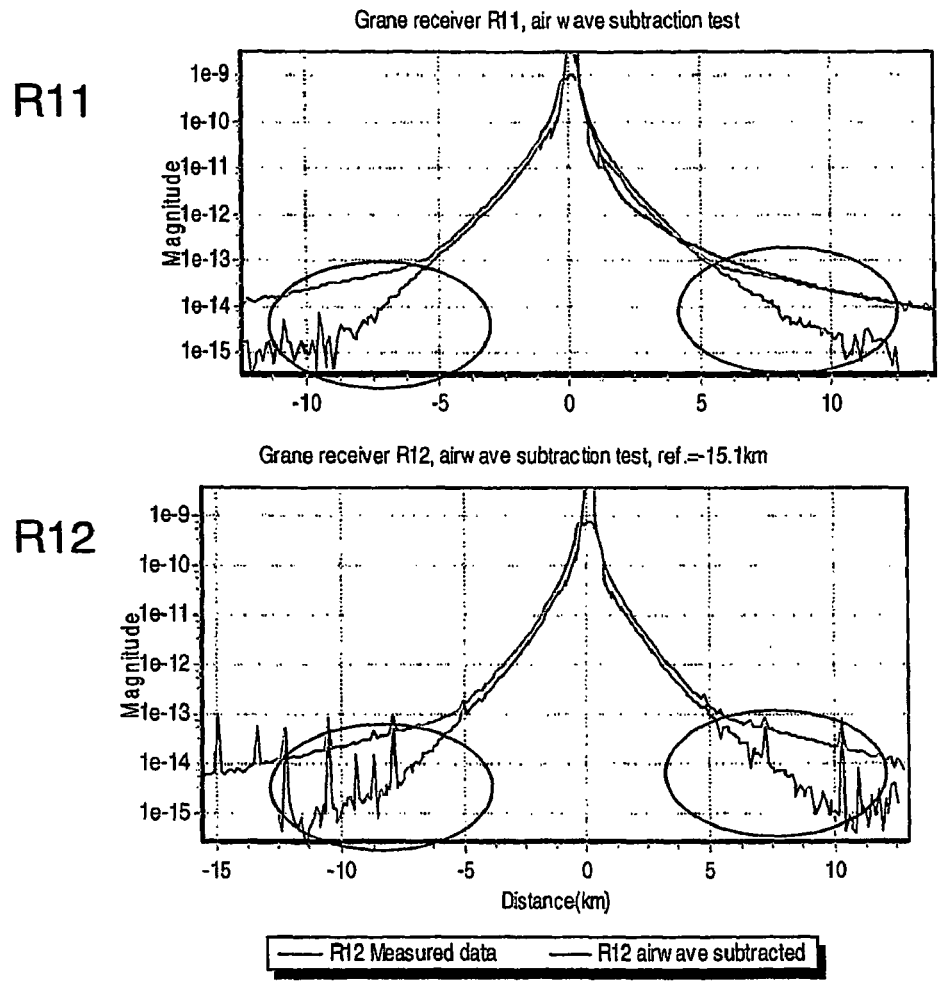
Fig. 21: Results from air wave subtraction on Grane receiver R12- and R11, for comparing gradients within segments in the offset range 5 -10 km.

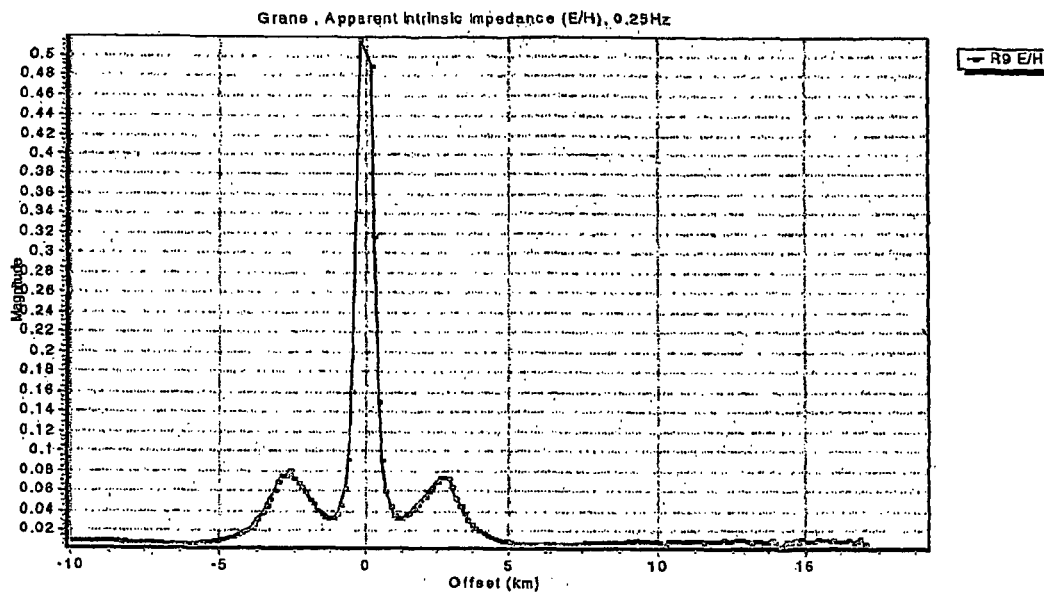
Fig. 22a: Data from the Grane field: Apparent intrinsic impedance
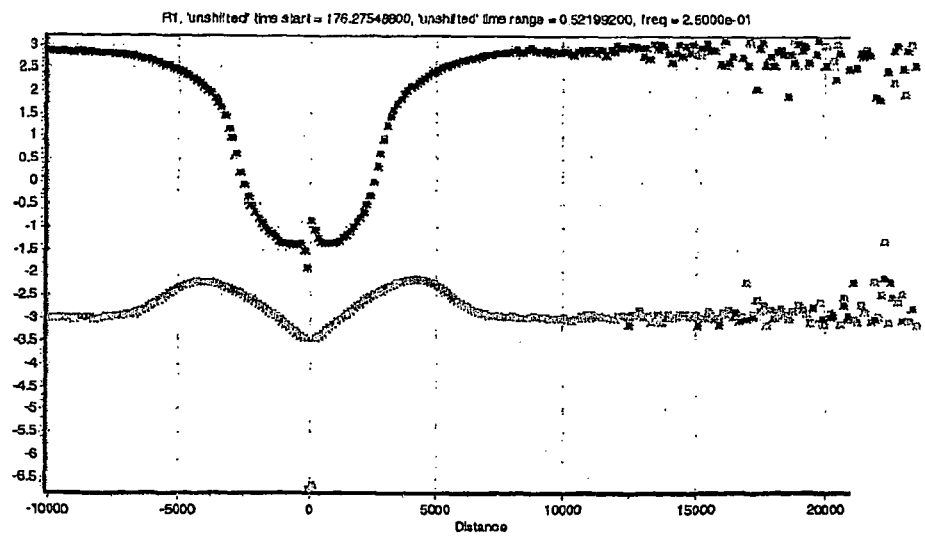
Fig. 22b: Measured data from the 2003- Grane survey. Plot of phase versus source-receiver offset, not mutually adjusted at large offsets. Lower plot: radial E-field, upper plot: azimuthal H-field.

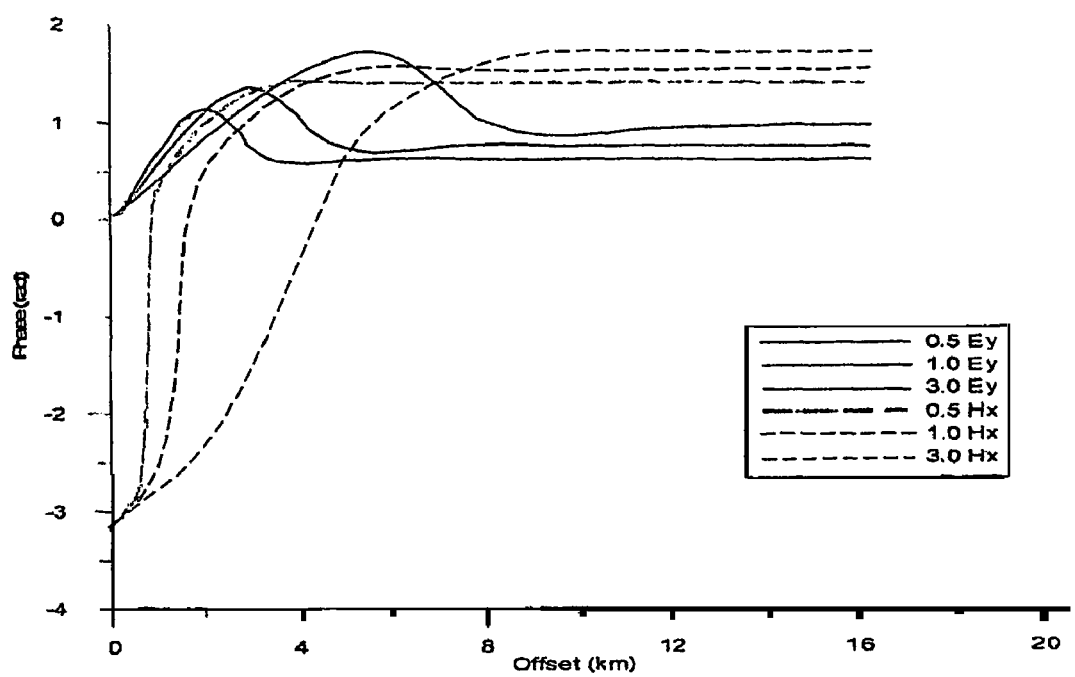
Fig. 22c: In-line E and cross-line H components, modelled phase versus source - receiver offset. Water depth 150 m, source elevation above the seafloor about 50 m, frequency = 0.25 Hz

ELECTROMAGNETIC METHOD ON SHALLOW WATER USING A CONTROLLED SOURCE

INTRODUCTION

The invention relates to geophysics. More particularly the invention relates to electromagnetic geophysics at sea for detecting petroleum bearing rock strata in the geological rock layers below the seafloor.

BACKGROUND OF THE INVENTION

The rock layers below the seafloor will be water saturated and contain ions making the rocks electrically conductive, thus that provide high conductivity or low resistivity, $\rho=0.7$ to 3 $\Omega$m. in this specification we will use the term resistivity, expressed in Ohm-meter abbreviated $\Omega$m. Petroleum in the form of oil or gas displaces water in pore spaces of such petroleum bearing rock layers. Petroleum does not dissolve salts and is thus a weak electrical conductor, thus petroleum bearing rock layers provides a high resistivity, $\rho=20$ to 200 $\Omega$m, and in some instances having a resistivity as high as 1000 $\Omega$m. Sea water contains many different dissolved salts and usually has a resistivity of about 0.3 $\Omega$m.

STATEMENT OF PROBLEM AND PRIOR ART

It is desired to find possibly petroleum bearing rock layers. One may explore geological structures by means of seismic prospecting, e.g. reflection or refraction seismics, amplitude variation with offset, etc., but petroleum bearing parts of a rock layer or a geological formation may in the seismic analysis not always be significantly distinguishable from non-petroleum bearing parts of the same formation or other non-petroleum bearing formations. In their American patent application US2003/0052685 and an article named "Remote detection of hydrocarbon filled layers using marine controlled source electromagnetic sounding", EAGE 64th Conference & Exhibition, Florence, Italy, 27-30 May 2002, Eidesmo et al. describe electromagnetic prospecting by means of a horizontally arranged electrical dipole transmitter and electrical dipole antennae arranged in the sea above a seafloor with a deeply buried hydrocarbon layer. The dipole antennae of the receivers are two horizontal orthogonal sets of electrodes. Eidesmo compares calculations from two models. One of the models comprises a hydrocarbon layer of 100 m thickness having a resistivity of 100 $\Omega$m and situated 1000 m below the seafloor having a resistivity of 1 $\Omega$m in sea water of 800 m depth. The other model has no hydrocarbon layer. The hydrocarbon layer provides a tenfold increase of relative signal amplitude between an in-line horizontal electrical source and a cross-line horizontal electrical source, at an offset of 4 to 6 km from the source. The hydrocarbon layer also provides significant phase differences between these two orientations of the electrical transmitter. This amplitude splitting is more significant than what may be expected from ordinary resistivity variations in the rock layers above the reservoir.

EMGS' method is also described in WO200013046.

U.S. Pat. No. 6,628,119 "Method and apparatus for determining the content of subterranean reservoirs" to Eidesmo et al. describes a method for determining properties of a subterranean reservoir of which position and geometry is known from previous seismic mapping. An electromagnetic field is imposed by a transmitter and detected by antennae which are also arranged at the seafloor. The detected waves' properties are utilized to determine whether the reservoir contains water or hydrocarbons.

The international patent application WO01/57555 defines a method for determining properties of a submarine reservoir of which the geometry is approximately known, of which said method comprises the following steps: application of an electromagnetic field varying in time to the layers containing the reservoir, detecting of the EM-wavefield response, searching in the wavefield response for a component representing a refracted wave, and determining of the content of the reservoir based on the presence or absence of a refracted wave component.

The international patent application WO00/54075 describes approximately vertical emission of electromagnetic waves for reflection from a potential reservoir, and is limited to prospecting immediately above the horizontal extent of the reservoir. A vertically emitting parabola antenna and receivers near that antenna are employed, all antennae arranged practically just above the reservoir.

American patent U.S. Pat. No. 4,258,321 Neale describes a vertical transmitter antenna for selected emission of vertically polarized signals or a loop antenna, and a pair of receivers, one of them having a vertical antenna and the other one with a loop antenna. A calibration signal is emitted along the Earth's surface and is received by all the receivers, and a difference signal in amplitude and phase is amplified and recorded, and is subtracted from measurement signals at each receiver later in the investigation.

The international patent application WO02/14906 of EMGS describes prospecting a submarine reservoir by transmitting from electrical dipole antennae in-line with receiver antennae towed in the sea, for receiving a first mode refracted response from a reservoir, and comparison with a second mode refracted from the same reservoir, of which the two modes may be orthogonal, or one of them a TM-mode and the other one a TE-mode, and so on.

Electromagnetic Geoservices have written in a document published on the Internet on www.emgs.no, a "Peer Review" of Constable from the Scripps Institution of Oceanography, that "The conclusions of the model assessment are that if the target is not too small compared with its depth of burial and the water depth is sufficient to suppress the air wave, then the controlled source signature of the oil-filled layer is detectable, yielding controlled source amplitudes that are a factor of 2 to 10 different than for models without the layer. The signals are above the noise threshold, and the experimental parameters (frequency, range, antenna and power) are practicable."

The present invention aims at exploiting rather than being hindered by the previous limitation expressed as "if the water depth is sufficient to suppress the air wave" cited above. The inventors suggest to conduct electromagnetic measurements using a preferably towed transmitter and stationary receivers in the sea, and measuring the electrical at a distance so far that one is quite sure that the air wave is essentially dominating and that waves through the rocks and the sea are essentially attenuated. Subsequently the electrical field as measured at far offsets is recalculated back to short offsets, and the recalculated field is subtracted from the measurements. What then remains is a corrected electrical field in which contributions from petroleum bearing high-resistive layers should appear more clearly.

One of Statoil's international patent applications, WO03/100467 Amundsen, "System and method for electromagnetic wavefield resolution", describes a method for processing an electromagnetic wavefield response during a seabed logging operation. The wavefield is separated into upward and downward propagating components. The downward propagating component represents reflections from the sea surface while the upwards propagating component represents reflections and refractions from subterranean layers. The upward propagating component is then made subject to analysis. According to Amundsen's page 2, lines 7-10, optimal processing, analysis and interpretation of electromagnetic data ideally require complete information about the wavefield so as for the wavefield to be separated into its upward and downward propagating components. In page 3, lines 25-28, Amundsen describes the components $E_1$ and $E_2$ as electrical fields in a first and second horizontal direction, and $H_1$ and $H_2$ as magnetic fields in a first and a second direction. In page 3, lines 8-9 Amundsen also clearly states that each recorded component of the electromagnetic wavefield should be properly calibrated before the resolution technique is employed. Amundsen also describes that calibration of the sensor's sensitivities to the E- and the H-fields may be conducted in the near field. However, the field gradients may be considerable in the near field and components that may not be easily controlled may prevail. The present method provides an alternative method for calibrating the receivers, please see below. Another of Statoil's international patent applications, WO2005/096021 Amundsen, "Electromagnetic wavefield analysis", describes a method for analysing electro-magnetic wavefields. The method comprises the steps of measuring electrical and magnetic fields using at least one receiver, formulating filters with respect to each of mutually orthogonal components for each of the electrical and magnetic fields, and application of the filters on the measured data for decomposing the wavefield in upward- and downward propagating components.

The present invention aims at utilizing rather than being hindered by the previous limitation expressed as "if the water depth is sufficient to suppress the air wave", above. The inventors suggest to conduct electromagnetic measurements with a preferably towed transmitter and stationary receivers in the sea, and measuring the electrical field at an offset so large that it is reasonable to believe the air wave is essentially dominating and that waves through the rocks and the sea are essentially attenuated. Subsequently a recalculation of the electrical field, as measured at large offsets, is made for shorter offsets, and the recalculated field is subtracted from the measurements. What remains is a corrected electrical field of which possible contributions from petroleum bearing high-resistive layers should appear more clearly. One of the advantages by the present invention is that data from only one field component is required, e.g. in-line E-field, in order to achieve the desired effect, in contrast to Lasse Amundsen's methods described in patent application WO2005/096021 which in its main claim describes that at least two components should be measured, both an electric and a magnetic component of the field, as cited: "A method of analysing an electromagnetic wavefield, the method comprising the steps of: measuring the electric and magnetic fields of at least one receiver; . . .".

Further, the present invention is also not dependent on that the sensor has a correct calibration constant for the absolute level (as long as all sensors are equal), as the "calibration" is conducted through the measurements at the far offsets. Correct calibration constants for E- and H-fields is conditional as described in Amundsen's patent application WO03/100467 cited above.

SHORT SUMMARY OF THE INVENTION

The present invention provides a solution to some of the above problems, and is a method for analysing acquired electromagnetic measurements R made on or in a sea 4 over a seafloor 1 with rock formations 3 having relatively low resistivity $\rho_3$ for detecting a possibly underlying petroleum bearing reservoir formation 2 having relatively high resistivity $\rho_2$, In which a low frequency electromagnetic transmitter 5 is arranged in the sea 4 and emits an electromagnetic field P propagating in the sea 4, in the rocks 3, 2 and in the air 0 above the sea; in which electromagnetic sensors 6 are arranged with desired offsets x in the sea 4 for measuring the electromagnetic field P(x) while the field propagates, characterized in that one or more component of the electromagnetic field P is measured at a large offset $x_L$ from the transmitter 5 where the field P essentially only has its origin from the field propagating as a field $P_0$ through the air 0; that the one or more components of the electromagnetic field P measured at the large offset $x_L$ is calculated back to a recalculated field $P_0(x)$ to one or more offsets x being shorter than the large offset $x_L$; that the recalculated field $P_0(x)$ is subtracted from the field P(x) for possibly highlighting a field which has its origin in resistivity anomalies in the underground such as the possibly petroleum bearing reservoir formation 2 having relatively high resistivity $\rho_2$.

Further advantageous specifications of the invention are to be found in the dependent patent claims.

The invention is illustrated in the attached drawings, which are meant to illustrate, but in no way limit the invention, which shall be limited by the attached claims only.

FIG. 1 shows the magnitude of the measured electromagnetic field, or "magnitude response", measured in V/Am$^2$, calculated from the layer models 1 and 2 (illustrated in FIG. 13) for a frequency of 0.25 Hz. The magnitude response is calculated with and without hydrocarbons in the reservoir. Please notice that for shallow water, hydrocarbons will result in a negative response between about 4 to 5 km and about 9 km from the source.

FIG. 2 shows a normalised magnitude response (relative response as compared to water-filled reservoir). The "Deepwater" curve has been cut at the expected noise floor for shallow water.

FIG. 3 shows curves for phase response calculated over model 1, (shallow water), 0.25 Hz.

FIG. 4 shows curves for phase response calculated over model 2, 0.25 Hz, (deep water). "Noise offset limit" indicates the expected offset at the noise limit for shallow water.

FIG. 5 shows normalised phase response (phase difference with respect to the background model).

FIG. 6 shows normalized magnitude response for model 1 for different frequencies.

FIG. 7 shows normalised phase response for model 1 for different frequencies.

Figure 13C:
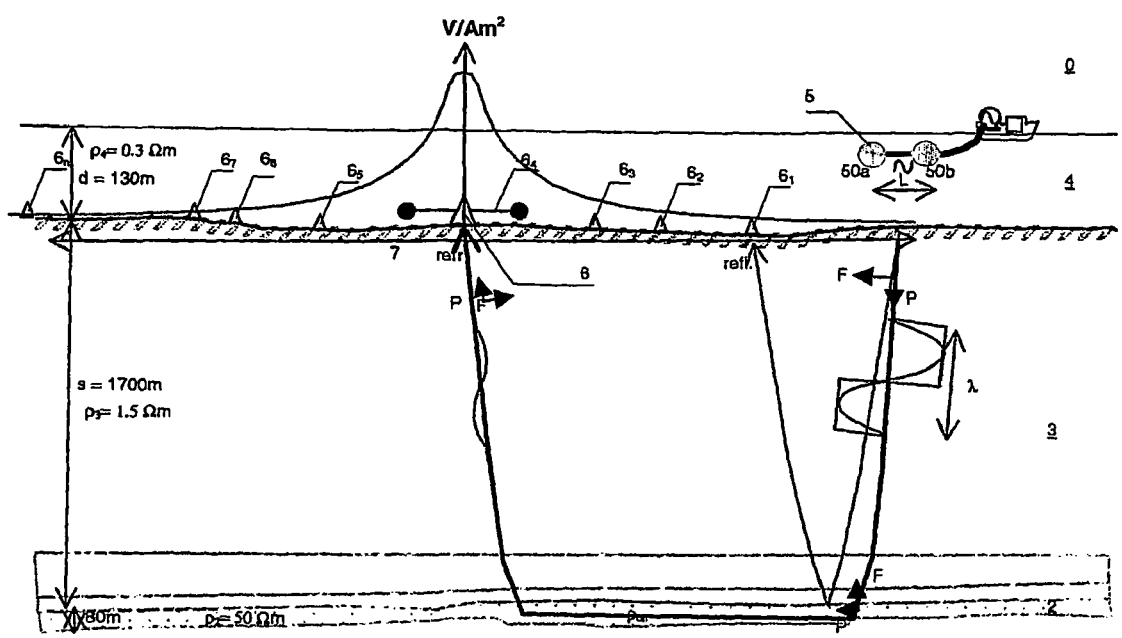

FIG. 8 shows calculated magnitude curves for three different expected values of the resistivity of the geological overburden layers 3. The resistivities are indicated in the diagrams. Otherwise the same parameters as in model 1.

FIG. 9 shows phase curves for three different resistivity values for the geological overburden layers 3. Otherwise the same parameters are used as in model 1.

FIG. 10 shows variation of the source depth along the HBL-line of the Grane survey in 2003. The receiver stations that the towed source passes over are indicated as R1, R2, . . . , R16.

FIG. 11 shows the changes in the phase curves as functions of small changes (10 m) in the elevations of the sources above the seafloor.

FIG. 12 shows results from modelling (model 1) with and without hydrocarbons, of the source 50 m above the seafloor and at the sea surface (125 m above the seafloor).

FIG. 13a illustrates the models for calculation of synthetic data. A shallow water model with and without a hydrocarbon bearing layer, and a deep water model with and without a hydrocarbon bearing layer.

FIG. 13b roughly illustrates the paths along which the electrical energy may propagate, and particularly that the energy for large offsets will propagate through the air.

FIG. 13c illustrates a vessel towing an electromagnetic antenna, e.g. an electrical horizontal dipole antenna, and the receivers arranged along the seafloor.

FIG. 14 shows magnitude from airwave subtraction on synthetic data from shallow water using model 1.

FIG. 15 shows results from airwave subtraction on synthetic data from shallow water (model 1); normalised magnitude, compared to normalised magnitude for the deep water case.

FIG. 16 illustrates results from airwave subtraction on synthetic data from shallow water (model 1); Normalised phase (phase difference) compared to normalised phase for the deep water case.

FIG. 17 shows results from airwave subtraction on the Grane receiver R12-magnitude.

FIG. 18 shows results from airwave subtraction on the Grane receiver R12-phase.

FIG. 19 shows results from airwave subtraction on the Grane receiver R11-magnitude.

FIG. 20 shows results from airwave subtraction on the Grane receiver R11-magnitude.

FIG. 21 shows results from the airwave subtraction on the Grane receiver in R12 and R11 for comparison with gradients within segments in the offset range 5-10 km. For the positions of receivers nr R11 and R12 please see FIG. 10 that shows the depth of the source and the positions for the receiving stations.

FIG. 22a illustrates real measurements from the Grane survey. The plot shows the apparent intrinsic impedance E/H for electromagnetic measurements performed at a transmission of 0.25 Hz. Please note that the graph flattens out at large offsets, that is where the air wave dominates. At this distance there is a constant relationship between E and H.

FIG. 22b shows measured data from the Grane survey in which is shown a plot of the phase with respect to the source-receiver distance. The phase differences are not put in a mutually correct relationship, but floating.

FIG. 22c illustrates modelled phase differences for analytical solutions for phase differences for in-line E and cross-line H components calculated for a water depth of 140 meters, keeping the antenna 50 meters above the sea floor and emitted frequency of 0.25 Hz. The graphs show phases as calculated through resistivities in the overburden of 0.5 Ωm, 1.0 Ωm and 1.5 Ωm.

DESCRIPTION OF THE INVENTION AND EXAMPLES OF MODELLED AND MEASURED DATA

The work in connection to this invention has been focused on analysing different aspects of using a method according to the invention, seabed logging (SBL) in shallow water, and for testing a novel method for air wave subtraction for emphasising a reservoir response under such conditions.

The data acquisition itself may be conducted as follows: The emitted electromagnetic field F is an alternating field having frequencies in the range of 0.01 to 200 Hz. The emitted electromagnetic field F may in a preferred embodiment comprise frequencies in the range 0.1 to 1 Hz, e.g. 0.25 Hz. The measured component of the electromagnetic field F is preferably the electrical field E. A component of the electromagnetic field F to be measured may also be the magnetic field B.

The transmitter 5 to be used may comprise electrodes 50a, 50b arranged with a separation in the sea floor so as for forming an electrical dipole transmitter 5 but it may also comprise a magnetic transmitter. The transmitter 5 is in this description a generally horizontal transmittal antenna with electrodes 50a, 50B arranged at generally the same depth, preferably towed behind a ship that provides electrical energy to the transmitter 5. A magnetic transmitter may alternatively be used and may be arranged for generating a field generally corresponding to the field from the electric dipole transmitter 5.

The sensor or measurement electrodes 6 are arranged preferably pair wise along a generally straight line 7 extending from the transmitter 5. A main axis in the transmitter 5 i.e. an axis between the electrodes 50A, 50B extends generally in the same vertical plane as the line 7, that is, the in-line E field is measured, in other words a so-called transverse magnetic or TM is described and used in these experiments. According to an alternative method according to the invention a main axis in the transmitter 5, i.e. an axis between the electrodes 50A, 50B, is arranged generally across the vertical plane through the line 7 with the sensors 6.

The transmitter 5 may be arranged shallowly or in the surface of the 4 or lowered towards sea floor 1 or at the sea floor 1.

In a preferred embodiment of the invention the survey is conducted in a sea area of which the depth of the sea floor 1 below the sea surface 4 is essentially less than the depth of the underlying petroleum bearing reservoir formation 2 below the sea-floor 1.

The analysis that have been performed show that it should be considered using other frequencies than what is used today in deep water and that using several frequencies and starting with lower frequencies may contribute additional information that may be decisive in the further data processing and interpretation work. The results also show that for shallow water one may probably allow to conduct data acquisition having the source on or near the surface with the advantages thus implied with respect to increased stability and control of the source.

The method that has been proposed in this invention for air wave subtraction has been tested on a set of synthetic data and also a set of real data from a geophysical survey at the Grane field, the so-called Grane Survey in 2003. The method according to the invention seems to work in a satisfactory manner, a more thorough testing is however required to learn to know the weaknesses and strengths of the method. We believe that the method according to the invention may be improved by calculating a more precise air wave for subtraction that better takes into consideration the radiation pattern for the source applied in the survey, and the resistivity of the geological overburden, i.e. the rocks 3 between the sea floor 1 and the layer 2 that may be petroleum bearing and thus may have a high resistivity. The term overburden will be used in the reminder of this description. One of the main advantages of the suggested method according to the invention is that no more than one vector component is required (here the in-line E-field is utilised). The method may be improved by including additional vector components and for example utilising information about wave propagation direction that may be obtained from the cross-product of the E and the H fields.

Motivation:

The desire to extend the use of HBL for use in increasingly shallow water depths necessitates the consideration of the influence of the air waves in more detail. For most cases, unless the reservoir is shallowly situated, the general opinion has been that one would depend on attenuating the contribution from the air wave in order to provide a sufficient difference of the electromagnetic response above and outside the reservoir. As mentioned above one of the conditions for electromagnetic logging of rocks in the sea beds according to Constable, is that one has a sufficient for the air wave to be suppressed.

The basis for making the invention was an attempt to develop routines for air-wave removal using wavefield separation but this does not seem to provide the desired effect for shallow water. The reason may be that one has started from a somewhat simplified model of the real world, the model among other requiring an absolute control of the calibration parameters for the electrical and magnetic receivers which in practice has been shown to be non-trivial.

The inventors have on the basis of those experiences suggested to test an alternative method which instead of being based on absolute calibration, uses the acquired measurement data over a long off-set range for "calibrating" and calculating attributes. With the suggested method according to the invention, absolute calibration will be superfluous as the local electrical and magnetic conditions in the environment of the receivers automatically will be taken into account.

The purpose is to try to utilise the fact that the air-wave that we wish to reduce propagates through two very homogenous media, water and air, both of which have quite precisely known or easily measured values of conductivity and permittivity. However work in this project has shown the air-wave so registered at far off-sets contains much energy from the underground closer to the source.

For long source-receiver offsets compared to the water depth, e.g. in the range of 10-15 km no other signals than the airwave will arrive. Based on the fact that the airwave alone is measured in this range we believe that it should be possible to recalculate the air-wave Influence for somewhat shorter offsets, e.g. 4-8 km where one will also have a response from the reservoir. The estimated airwave response may be used later for subtraction or another form of compensation or "attribute construction" so as for the reservoir to become more visible in the data.

Methods based on the principle according to the invention may be used to handle local variations in the receiver response ("coupling") as one may choose to use the same physical receivers/receiver groups in the two offset classes (10-15 km and 4-8 km). The optimal offset classes will depend on the model and the acquisition parameters, in particular frequency, and must be considered in each specific case by analysis of the measurement data and modelling.

1D-Modelling

For better to understand the contribution from the airwaves in the data for shallow water, 1D modelling has been conducted. As a basis a model being a simplified version of the situation at Grane:

Model 1 is defined as follows:
Water depth: 130 m
Overburden resistivity: 1.5 Ωm
Reservoir resistivity: 50 Ωm (0.8 Ωm if not petroleum bearing, i.e. water bearing)
Reservoir depth (below the sea floor): 1700 m
Thickness of the reservoir: 80 m
"halfspace", that is everything in the "halfspace", below the abovementioned: 2 Ωm We define model 2 equal to model 1 except from the difference that the water depth is defined to be 2000 meters instead of 130 m, so as for the air pulse not to influence the results (if the transmitter and the receiver are situated at the sea floor). We thus have a model for shallow water and one for deep water.

Firstly we consider the frequency of 0.25 Hz, subsequently we will also conduct some modelling for other frequencies to compare.

Response from the Reservoir with and without an Airwave (Shallow and Deep Water)

FIGS. 1 to 5 show the results from 1D modelling using models 1 and 2, with and without hydrocarbons for 0.25 Hz. From FIG. 1, which displays magnitude versus offset we see that model 1 (shallow water) generally gives stronger signals but less separation between hydrocarbon filled and water filled reservoir. We also see that the response to a hydrocarbon bearing reservoir present in the model with shallow water is the opposite (negative) as compared to the model with deep water, please see from about 4.5 km offset from the source. This is better illustrated in the normalised graphs shown in FIG. 2 where for shallow water the graph falls below 1 when one has passed 4 kilometers. In FIG. 1 we have indicated by a red line the expected noise level. This is based on data from the HBL survey on the Grane field in 2003. We have studied at which offset the noise begins to dominate and related this to the model results for shallow water. Considering that the noise level for shallow water is higher than for deep water due to a reduced screening effect against the magneto-telluric noise a so-called MT noise one may not achieve a better separation than what is limited by the noise line even with a "perfect" traditional separation method. Thus we have put the vertical scale of FIGS. 2 and 4 so as for the graphs not to be shown when passing below such a noise limit.

FIGS. 3 and 4 show phase responses. We see that we have a similar situation for the phase as for the magnitude that is an opposite response for the presence of a hydrocarbon bearing layer between the models for respectively deep and shallow water. Additionally we notice that the phase response for shallow water is not much less than for deep water if one takes into account the expected noise level.

Variations in Response for Different Frequencies

The response changes with the frequency. This is valid both for the model with shallow and the model for deep water, whereas the effect is expressed somewhat differently in the raw data. In shallow water the visible reservoir response in the raw data will diminish at higher frequencies, while it is normally amplified for lower frequencies. The reason for this is probably that the airwaves content of "refracted waves" from the substrata is reduced for higher frequencies, whereas concurrently the loss in the "direct wave" in the substrata increases.

FIGS. 6 and 7 show the response in shallow water (model1) for three different frequencies (0.1, 0.25, and 1 Hz).

The Airwave Comprises Information about the Substrata.

While studying the modelling results, one may see that the substrata effects the airwave. This means that energy that first propagates downwards into the substrata and then reappears at the surface passes through the water layer and into the air for then being registered as a part of the airwave at a far offset receiver. Please see FIG. 13b. Energy will also pass through the air and into the ground. Which proportion of energy that belongs to the different paths depends on the resistivity model, the frequency, the source elevation above the sea floor, the radiation pattern (the source signature) and water depth.

The radiation pattern from an electrical antenna (in the near field) may be rather complicated to calculate for shallow water conditions, particularly for varying electromagnetic properties of the substrata. Presently calculation programs that handle those problems well and in detail are not available.

We may however achieve a simplified solution using a 1D modelling program calculating the response from a unitary dipole source. In this project we have tried to use a 1D program for finding the strength of the air pulse for far offsets as a function of the resistivity of the overburden. Three different resistivity in the overburden have been selected: 0.3 Ωm (corresponding to seawater), 1.5 Ωm ("ordinary" overburden), and 5 Ωm ("high resistivity overburden"). The other parameters (source depth etc.) are equal and as defined for model 1 (see above in the specification).

The results of those calculations are displayed in FIG. 8, showing magnitude graphs for three different resistivities for the geological overburden layers on the petroleum burden layer, and FIG. 9, showing the effect in the phase graphs for correspondingly varying resistivities in the overburden geological layers. The air wave dominates where the phase response is flat (apparent velocity equals infinity), and from FIG. 9 we may see that the air wave starts dominating at different offsets for the three models. This image is due to that the contribution from interference from the "direct wave" is stronger and more prevailing for higher overburden resistivities.

By studying the range to the far right in the drawings (at 20 km offset), where the air wave dominates for all models, and where the phase graphs are flat, see FIG. 9, we see that the strength of the signal is different for the three cases, see FIG. 8. The figures show that the air wave is recorded stronger when the overburden resistivity is high than when it is low. This means that the "air wave" contains geological information and does not merely consist of energy propagating directly from source to receiver. We will not analyze the problems as to which proportion of this increase is a result of the changes in the near-field of the source (source impedance etc.), or to the receivers, or in the form of reflections, refractions along the path. We simply state the magnitude of the air wave, as recorded on receivers at large offsets, is affected by the resistivity of the substrata. It comprises intrinsically geological information which may be exploited through inversion and interpretation.

Source Depth Effect
Source Depth Variations Affect the Measurements.

When the elevation of the source above the seafloor and/or depth below the sea surface is changed, the signals received at the receivers for different offsets also vary. This relates both for shallow and deep water, but the effect is stronger for shallow water as the relative change of depth relative to the sea surface is larger. This also relates to the magnitude- and phase response, but relatively more to the phase response. The effect increases with increasing frequency.

FIG. 10 shows how the source depth may vary along a line in practice. The data are taken from the HBL-survey on the Grane field in 2003, and show that the depth for the transmitter 5 varies between 70 m and 105 m.

For further investigation of the effect of varying source depth, we have conducted simple modelling with a basis in model 1 (model without hydrocarbons) described above, in which we calculated the response for different source depths and frequencies. The results of those calculations are shown in FIG. 11, and show difference in phase where the elevation of the source above the seafloor varies from 40 m to 60 m. During inversion of multi-frequency data particularly the elevated frequency must be corrected for the relatively large changes of the phase. In situations in which one looks for small changes in the geological underground, one should also correct for the lower frequencies for phase shifts being introduced due to variation in the elevation of the source along the line.

New Possibility: the Source May be Towed on or Near the Surface.

We have conducted 1D-modelling with the source 50 m above the seafloor and with the source just below the surface (125 m above the seafloor), with and without hydrocarbons, for studying the effect on the response.

The results, shown in FIG. 12, show that the changes in the magnitude response as a function of source position are small, and that the relative hydrocarbon response (difference with and without hydrocarbons) is about equal.

This means that for a shallow water model such as this (model 1 with different depths of the source), the difference in towing the source near the bottom or on the surface is small. This means that the source according to a preferred embodiment of the invention just as well may be towed directly in or just below the sea surface. There are considerable advantages in doing it this way. If the source antenna is connected to buoyancy elements at the surface, one may ascertain a constant source depth and a constantly horizontal orientation of the antenna throughout the length of the survey. Further, it would be simpler to keep control and provide a more precise log of the source azimuth. In total, this would provide improved control of the source and improved stability of the source. Through towing at the surface it would also be possible to handle other and stronger sources than what are used presently. One would also be able to utilize the possibilities residing in the fact that one may use shorter supply cables, and thus reduce the energy loss.

Modelling has shown that if the source and/or the receivers are closer to the sea surface, the signal level may increase considerably without loosing much of the response difference from the reservoir. We have seen that, e.g. for extremely high phase responses, differences between a hydrocarbon bearing reservoir rock case and water filled reservoir rock cases may be found for some frequencies if the source and/or the receivers are arranged nearer to the sea surface.

Air Wave Subtraction—Novel Method

As we have seen through modelling presented above in this specification, the air wave will to a large extent affect the shallow water registrations. For large offsets, the air wave is totally dominating. Thus there is a desire that this effect is reduces so as for the response from the substrata and particularly some geological formations are relatively amplified in the data. Below we present a method in which just this effect of amplifying the response from the substrata relative to the air wave is the purpose.

The Principle of the Method

The principle of the method has the following elements:
  For large source-receiver offsets (compared to water depth), no other signals than the air wave will arrive.
  Based on the fact that one may measure the air wave in this interval, the invention proposes a method for recalculating the air wave's effect for shorter offsets than the large source-receiver offsets. For shorter offsets there is also a response from the highly resistive reservoir.
  the estimated air wave response is subtracted from the measured signal so as to amplify the effect from the high resistivity reservoir.

The airwave subtraction routine may be described as follows:
  the shape of the air wave signal is estimated, e.g. by means of modelling, of which the model is a simplified background model (air, sea, geological overburden), e.g. only air and sea water. This way of calculating the shape of the air pulse is a simplification and may be improved e.g. by using a more detailed model for the geological overburden. In the model, the source and the receivers are arranged in the same level below the sea surface as for which the measurement data shall be acquired. During the modelling the correct kind of source is used, e.g. a horizontal dipole having a given length, and the receiver type.

The absolute level of the air wave is found from the measured data. One or more offset locations ("far offset") are selected, where one may see from the measurement data that there is an air wave only (that is, the phase gradient is zero). The level of the air wave is set equal to what is measured in this reference location, or those reference locations, (if several are used).

Thereby, the level and shape of the air wave magnitude and phase is achieved as a function of offset, and one may subtract this effect from the measured data.

The mathematical calculations are conducted in the complex plane.

The method for air wave separation is thus based on "calibrating" the data based on the actual registrations at long offsets. In this manner one partially takes into account that the airwave is influenced by the overburden. The geological overburden causes the level of the airwave at long offsets to be raised compared to the airwave calculated using the land sea-model, and this raise is taken into account by moving the initially calculated airwave up to this level. Furthermore there is an expectation that the calculations using such an approach will not be particularly sensitive to small and individual calibration errors in-between the instruments, and to effects in changes in local geological and topological attached to single receivers. Further testing using real data will show how robust the method will be when applied.

Testing of the Method Using Synthetic Data

Below is described a test of the method using synthetic data. Instead of using field data, the measurement data is calculated using EM-modelling.

The method will otherwise be the same as for real data.
The method is as follows:
Calculation of synthetic measurement data using a resistivity model: In this case model 1 is used, presented above as the simplified Grane model.
Run the airwave subtraction routine (as above described).
Comparison of the results with results from modelling of the "deep water case" model 2 (corresponding to model 1, but having a water depth of 20 km).
The calculation is conducted for two different cases: Both with hydrocarbons and without hydrocarbons present at the reservoir level. In this way one may also compare normalised values.

The models used for calculating the synthetic "measurement data" are illustrated in FIG. 13a. The results of the tests are shown in FIGS. 14, 15, and 16.

We see from that the results that the methods in a satisfactory manner for these models. The method amplifies the magnitude of the hydrocarbon result beyond outside about 4 km from the source up to a level which is higher than for the deepwater case. The phase response after the airwave subtraction is approximately the same as for the deep water case.

Test of the Method on Real Measured Data from the Grane Field

We have further tested the method according to the invention on data from two of the receivers from the Grane survey from 2003, receivers R11 and R12, situated at either sides of the reservoir, please see FIG. 10, in which these two stations are situated on either sides relative to the position of the reservoir. The results of the calculations are shown in FIGS. 17-20.

If, after the airwave has been subtracted, one compares the amplitude gradients very closely for large positive offsets, we see that R11 on the positive offset side has a lower absolute gradient than R12. Comparing the gradients on the negative offsets in detail the effect is opposite, please see FIG. 21. This may indicate that the reservoir is visible in the data.

Comments to the test on the gathered data from the Grane Survey:
The results from this exercise seem to point in the right direction but it would be desirable to have measurements from an oilfield at relatively shallow water depths at sea with better conductivity conditions than the Grane field. Previously conducted 1D inversions of the Grane data show that the resistivity profile is considerably less suited for detection than the model used in the test on the synthetic data. In Grane there seems to be higher and varying resistivity in the overburden and high resistivity just below the reservoir level (observed using the initial inversion exercises).
One should pre-process the data to remove noise before conducting the airwave separation, and subsequently chose the reference point for "full airwave contribution" with great care.
One could include additional components, for instance the magnetic data in this kind of airwave separation, and also include the directional information P=E×H, where P is a Poynting vector in the plane of energy propagation direction, such as a locality specific calibration allows.
The method assumes that one knows/may measure the antenna emission pattern. So far we have assumed that the source is unitary dipole (this also applies for 1D inversion). This is probably not the case for the measured data of the Grane Field, in which asymmetry has been observed in the data, and there is probably much progress to be made in this area.
Please note that the method requires good data at long offsets. The data from Grane are at the limit of the required quality, many are good enough, some have too much noise.
The phase calculations are sensitive to the source depth relative to the sea surface. The source depth varies in the Grane survey, amongst others partially due to passing marine installations and this may explain why the phase data at Grane do not seem to be uniform at this stage of the processing. Independently of this, it may be an advantage to tow the source at the surface.

Calibration of Receivers

FIG. 22a illustrates real measurements from the Grane survey. The plot shows so-called apparent intrinsic impedance E/H for electromagnetic measurements performed at using emission of 0.25 Hz. One may clearly observe that the plot flattens at large offsets in which the airwave dominates. At this distance there is also a clear relationship between E and H. An alternative to Amundsen's method may be to exploit this constant relationship E and H at long distances. Calibration of the relative phase between E and H-fields in which airwaves predominate and in which the phase has flattened out may be conducted as one knows that the phase difference between the two graphs should be constant, normally equal to 4 degrees, almost independently of the underlying geological model, for normal resistivities in the sea bed rocks. One will observe that this difference in the model calculated in FIG. 22c will confirm this, please see below. The magnitudes of the signal ration E/H will also be constant where the airwave predominates, but the constant will be affected by the resistivity in the substrata. However if one first has calibrated the phase, one may through analysis of phase data for shorter offsets calculate an approximate resistivity profile and use this for far offsets to calibrate also the magnitudes.

Further FIG. 22b shows measured data from the Grane survey in which plots of phase versus source receiver separation are shown. Here the phase differences are not show in the correct relationship, but are given a random phase difference for far offsets however one will know that the phase difference shall be about 45 degrees for large offsets, and one will thus have the phase difference calibrated for a receiver in passing the source above the receiver.

FIG. 22c illustrates modelled phase differences for analytical solutions for phase differences for inline E and cross-line H components, calculated for a water depth of 150 m, having the antenna 50 meters above the seafloor, and an emitted frequency of 0.25 Hz. The graphs show phases for 0.5 Ωm, 1.0 Ωman d 1.5 Ωm. The phase is here given in radians. One will realize that the calculated phase difference between 0.5 Ωm resistivity in the sea floor and the calculated Ey and Hx, 1.0 Ωm resistivity and calculated Ey and Hx, and 3 Ωm resistivity and calculated Ey and Hx, all are quite exactly $\pi/4$ for large offsets, i.e. 45 degrees.

CONCLUSION

The method according to the invention for airwave subtraction seems to work in a satisfactory manner, but more tests on real field data may be necessary for ascertaining the strengths and weaknesses in additional detail. The method may be developed and improved in several aspects amongst others by calculating an increasingly correct airwave for subtraction better taking into consideration that the radiation pattern for the applied source (and not the theoretical source) which is applied in the survey, and the resistivity in the overburden. Even though one of the main advantages of the proposed method being that no more than one vector component is required (here tested on inline E fields), one should look further to investigate whether the method may be improved by including more vector components.

Among the advantages of seabed logging in shallow water are as follows:

A method may be a generally higher signal level—more energy overall propagates in the substrata.

The method allows stabilising the source and facilitates the measurements of the source direction by towing the source at or near the sea surface. One possible disadvantage of the method is the risk for having a somewhat elevate magneto-telluric, i.e. atmospherically generated electromagnetic noise.

The method also paves the way for novel possibilities through use of stronger sources having improved positioning control, as the method allows the source to be towed at or near the surface where it is possible to see and attach buoys connected to the source and antenna elements.

The method renders possible the utilisation of additional information resulting from vertical propagating waves at large offsets for calibrating instruments and/or finding the resistivity profile by inversion.

The invention claimed is:

1. A method for processing and analysing acquired electromagnetic measurements (R) made at or in a sea (4) over a seafloor (1) with rock formations (3) having relatively low resistivity ($\rho_3$) for detecting a possibly underlying petroleum bearing reservoir formation (2) having relatively high resistivity ($\rho_2$), wherein a low frequency electromagnetic transmitter (5) is arranged in the sea (4) and emits an electromagnetic field (F) propagating in the sea (4), in the rocks (3, 2) and in the air (0) above the sea;

wherein electromagnetic sensors (6) are arranged with desired offsets (x) in the sea (4) for measuring the electromagnetic field (P(x)) while the field propagates, characterized in that one or more component of the electromagnetic field (F) is measured at at least one large offset ($x_L$) from the transmitter (5) where the field (F) essentially only has its origin from the field propagating as a field ($P_0$) through the air (0);

that the one or more components of the electromagnetic field (F) measured at the large offset ($x_L$) is calculated back to a recalculated field ($F_0(x)$) to one or more offsets (x) being shorter than the large offset ($x_L$);

that the recalculated field ($F_0(x)$) is subtracted from the field (F(x)) for possibly highlighting a field which has its origin in resistivity anomalies in the underground such as the possibly petroleum bearing reservoir formation (2) having relatively high resistivity ($\rho_2$).

2. The method according to claim 1, wherein said transmitter (5) is towed in the sea and in which said receivers are stationary.

3. The method according to claim 1, wherein said emitted electromagnetic field (F) is an alternating field having frequencies in the range 0.01 to 200 Hz.

4. The method according to claim 3, wherein said emitted electromagnetic field (F) is an alternating field having frequencies in the range 0.1 to 1 Hz.

5. The method according to claim 1, wherein said component of said electromagnetic field (F) being measured is an electrical field (E).

6. The method according to claim 1, wherein said component of said electromagnetic field (F) being measured is a magnetic field (B).

7. The method according to claim 1, wherein said transmitter (5) applied comprises electrodes (50A, 50B) arranged having a separation in said sea (4) so as for forming an electrical dipole transmitter (5).

8. The method according to claim 7, wherein said transmitter (5) is a generally horizontally arranged transmitter antenna of which said electrodes (50A, 50B) are arranged at generally the same depth.

9. The method according to claim 8, wherein said sensors (6) are arranged in the form of pairs of electrodes on separate measuring stations or as electrodes along a sensor cable being arranged along a generally straight line (7) extending from said transmitter (5).

10. The method according to claim 9, wherein a main axis of said transmitter (5), i.e. an axis between said electrodes (50A, 50B), for the case of which said source is an electrical dipole, extends generally in the same vertical plane as said line (7).

11. The method according to claim 9, wherein a main axis of said transmitter (5), i.e. an axis between said electrodes (50A, 50B), for the case of which said source is an electrical dipole, extends generally perpendicular to a vertical plane as said line (7) with said electrodes (6).

12. The method according to claim 1, wherein said transmitter (5) is arranged in, on or near the surface of said sea (4).

13. The method according to claim 1, wherein said transmitter is submerged in said sea (4).

14. The method according to claim 13, wherein said transmitter (5) is arranged on or near the seafloor (1).

15. The method according to claim 13, wherein said transmitter (5) is arranged between the seafloor (1) and the surface of the sea (4).

16. The method according to claim 1, wherein the depth of the seafloor (1) under the surface of the sea (4) is essentially less/shallower than the depth of the underlying petroleum bearing reservoir formation (2) below the seafloor (1).

17. The method according to claim 1, wherein the transmitter (5) applied comprises a magnetic dipole source or a combination of an electrical dipole source and a magnetic dipole source.

* * * * *